(12) United States Patent
Sanjiv (10) Patent No.: US 10,086,653 B2
(45) Date of Patent: Oct. 2, 2018

(54) ELECTRONIC CONTACTLESS HORN AND SOUND DEVICE

(71) Applicant: Patel Sanjiv, Bedford, PA (US)

(72) Inventor: Patel Sanjiv, Bedford, PA (US)

( * ) Notice: Subject to any disclaimer, the term of this patent is extended or adjusted under 35 U.S.C. 154(b) by 0 days.

(21) Appl. No.: 15/301,727

(22) PCT Filed: May 1, 2014

(86) PCT No.: PCT/US2014/036416
§ 371 (c)(1),
(2) Date: Oct. 4, 2016

(87) PCT Pub. No.: WO2015/167572
PCT Pub. Date: Nov. 5, 2015

(65) Prior Publication Data
US 2017/0120812 A1    May 4, 2017

(51) Int. Cl.
*B60Q 1/00* (2006.01)
*B60C 5/00* (2006.01)
*G10K 9/13* (2006.01)
*H04R 3/00* (2006.01)
(Continued)

(52) U.S. Cl.
CPC ............... *B60C 5/005* (2013.01); *G10K 9/13* (2013.01); *H04R 3/00* (2013.01); *H04R 7/18* (2013.01); *H04R 9/06* (2013.01); *H04R 2430/01* (2013.01)

(58) Field of Classification Search
CPC . B60Q 5/005; H04R 7/18; H04R 9/06; H04R 3/00; H04R 2430/01
USPC .... 340/435, 457, 384.1, 148, 436, 901, 905, 340/539.11; 701/32.3
See application file for complete search history.

(56) References Cited

U.S. PATENT DOCUMENTS

| 4,241,334 A | 12/1980 | Shintaku |
| 4,540,975 A | 9/1985 | Kobayashi |
| 5,012,221 A | 4/1991 | Neuhaus et al. |

(Continued)

FOREIGN PATENT DOCUMENTS

| CN | 88201308 | 8/1988 |
| CN | 2695295 | 4/2005 |

(Continued)

OTHER PUBLICATIONS

International Search Report and Written Opinion for PCT/US14/36416, dated Sep. 26, 2014.

(Continued)

*Primary Examiner* — Dhaval Patel
(74) *Attorney, Agent, or Firm* — Wiley Rein LLP (57) ABSTRACT

An apparatus related to a contactless sound device, such as a horn, which may be configured to output different and/or multiple pitches using a replaceable, or interchangeable, electronic integrated circuit ("IC") module is disclosed. The electronic IC module may include one or more sequencers electrically connected via one or more relays to at least one signal generator which is electrically connected to an output driver. Each signal generator is configured to generate at least one frequency signal, and optionally multiple frequency signals. The electronic IC module may be physically attached to an IC connection interface located on the exterior of the contactless horn body. The IC connection interface electrically connects the electronic IC module to an electromagnet that drives the diaphragm of the contactless horn to create the selected preconfigured frequency sound.

20 Claims, 6 Drawing Sheets

(51) Int. Cl.
*H04R 7/18* (2006.01)
*H04R 9/06* (2006.01)

(56) References Cited

U.S. PATENT DOCUMENTS

| | | |
|---|---|---|
| 5,109,212 A | 4/1992 | Cortinovis et al. |
| 5,293,149 A | 3/1994 | Wilson et al. |
| 5,841,367 A | 11/1998 | Giovanni |
| 6,326,887 B1 | 12/2001 | Winner et al. |
| 6,389,148 B1 | 5/2002 | Yoo et al. |
| 6,456,193 B1 | 9/2002 | Wan |
| 2004/0078616 A1 | 4/2004 | Yamakawa |
| 2006/0287829 A1 | 12/2006 | Pashko-Paschenko |
| 2009/0261979 A1 | 10/2009 | Breed et al. |
| 2010/0045451 A1 | 2/2010 | Periwal |
| 2010/0164695 A1 | 7/2010 | Choi |
| 2011/0087417 A1 | 4/2011 | Anderson et al. |
| 2011/0304445 A1 | 12/2011 | Nakayama |
| 2012/0092185 A1 | 4/2012 | Hayashi et al. |
| 2012/0232769 A1 | 9/2012 | Nyu et al. |
| 2013/0076504 A1 | 3/2013 | Nakayama |

FOREIGN PATENT DOCUMENTS

| | | |
|---|---|---|
| CN | 2712730 Y | 7/2005 |
| EP | 1545936 | 8/2010 |
| FR | 2 519 493 | 7/1983 |
| JP | H09-114467 | 5/1997 |
| JP | H11-70836 | 3/1999 |
| JP | H11-208370 | 8/1999 |
| JP | 2002-354853 | 12/2002 |
| JP | 2011-213228 | 10/2011 |
| WO | 2010035123 | 4/2010 |
| WO | 2013/045343 | 4/2013 |
| WO | 2013/176652 | 11/2013 |

OTHER PUBLICATIONS

International Search Report and Written Opinion for PCT/US14/26518, dated Sep. 29, 2014.

Supplementary European Search Report for EP Application No. 14890641.5, dated Sep. 6, 2017.

ELECTRONIC CONTACTLESS HORN AND SOUND DEVICE

BACKGROUND

Apparatuses consistent with the exemplary embodiments relate to a contactless sound device, such as a horn, that may be configured to output different and/or multiple pitches using a replaceable, or interchangeable, electronic integrated circuit ("IC") module. In particular, the exemplary embodiments relate to a more energy-efficient and longer-lasting sound device that utilizes a contactless horn or sound device in connection with a replaceable, or interchangeable, electronic IC module to generate sound.

Apparatuses of the related art include a metal contact, typically but not always made out of tungsten, which is magnetically manipulated by an electromagnet in order to cause the diaphragm of a horn to move, thus generating sound in a single pitch. By varying the distance between the contact and the diaphragm, one may manipulate the horn to output different pitches. However, in order to vary the distance between the contact and the diaphragm, and thus achieve these different pitches, the horn's physical structure must be changed, which is a time-consuming, labor-intensive, and costly exercise.

Furthermore, in the related art, the contact used by the sound device requires a relatively large amount of energy to move the diaphragm due to the extra weight of the metal contacts required by the related art horn designs. The use of metal contacts in a horn or sound device may also cause sparking around the contact, which increases the risk of fire when the horn is used in certain environments, thus making these related art apparatuses unsuitable for use in highly flammable environments such as mining operations. The fire risk inherent in related art horn and sound devices also limits the types of materials that can be used in the construction of the horn to materials that are nonflammable, thus precluding the use of some lightweight and/or less expensive alternative materials in the horn design.

The metal contacts used in related art horn devices also frequently wear out or corrode, thereby forcing the user to replace the contact or, in most cases, the entire horn.

In certain applications, such as in vehicle horns, there is a need for a horn that can produce multiple pitches. Currently, vehicle manufacturers use multiple horns (typically one low note horn and one high note horn) to overcome this limitation. However, the use of multiple horns increases the weight of the vehicle, which negatively impacts the fuel efficiency of the vehicle and increases the energy usage of the vehicle. Indeed, extant vehicle horns consume a large amount of energy, making them undesirable for use in electric and hybrid vehicles.

SUMMARY

According to an aspect of one or more exemplary embodiments, there is provided a contactless horn and sound device including a replaceable, or interchangeable, electronic IC module, which provides greater energy-efficiency over related art horn and sound devices by eliminating the metal contacts required by prior art designs.

According to another aspect of one or more exemplary embodiments, there is provided a contactless horn and sound device with a replaceable, or interchangeable, electronic IC module, with a longer expected lifespan than prior art horn and sound devices through the elimination of the metal contacts required by prior art designs.

According to another aspect of one or more exemplary embodiments, there is provided a replaceable, or interchangeable, IC module that allows a single contactless horn and sound device to generate multiple frequency tones.

According to another aspect of one or more exemplary embodiments, there is provided a replaceable, or interchangeable, IC module that allows for faster and easier modification of the tones produced by the contactless horn and sound device.

According to another aspect of one or more exemplary embodiments, there is provided a contactless horn and sound device that may be used in highly flammable environments.

According to another aspect of one or more exemplary embodiments, there is provided a contactless horn and sound device that may be constructed out of lighter weight materials.

According to another aspect of one or more exemplary embodiments, there is provided a contactless horn and sound device that may be constructed out of less expensive materials.

According to another aspect of one or more exemplary embodiments, there is provided a contactless horn and sound device that is more energy efficient and more suitable for use in hybrid and electric vehicles.

According to an aspect of one or more exemplary embodiments, there is provided a contactless horn that may be configured to output different and/or multiple pitches at different intervals using a replaceable, or interchangeable, electronic IC module. The electronic IC module may include one or more sequencers electrically connected via one or more relays to at least one signal generator which is electrically connected to an output driver. If present, the one or more sequencers may be used to select the at least one signal generator. Each signal generator is configured to generate at least one frequency signal, and optionally multiple frequency signals. The output of the signal generator is electrically connected to an output driver, which amplifies the signal received from the signal generator. The electronic IC module may be physically attached to an IC connection interface located on the exterior of the contactless horn body. The IC connection interface electrically connects the electronic IC module to an electromagnet that drives the diaphragm of the contactless horn to create the selected pre-configured frequency sound(s).

DETAILED DESCRIPTION OF EXEMPLARY EMBODIMENTS

Reference will now be made in detail to the following exemplary embodiments, which are illustrated in the accompanying drawings, wherein like reference numerals refer to the like elements throughout. The exemplary embodiments may be embodied in various forms without being limited to the exemplary embodiments set forth herein. Descriptions of well-known parts are omitted for clarity.

Figure 1:
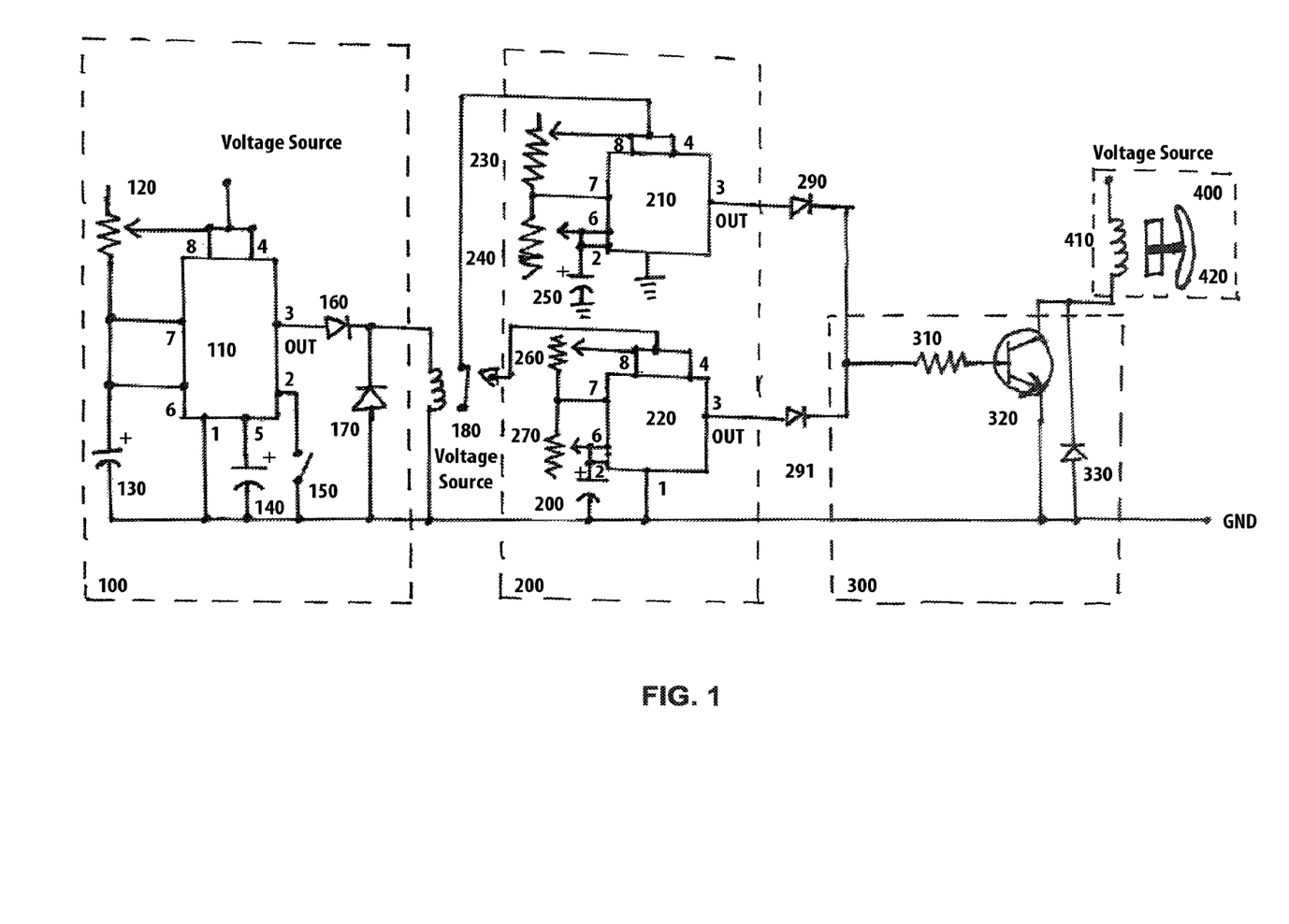
FIG. 1 is a circuit diagram illustrating an electronic circuit for a contactless horn and sound device according to an exemplary embodiment.

FIG. 1 is a circuit diagram of an electronic circuit for a contactless horn and sound device according to an exemplary embodiment. Referring to FIG. 1, a contactless horn and sound device according to an exemplary embodiment may include a sequencer 100, a relay 180, a signal generator 200, an output driver 300, and a contactless horn and housing 400.

The sequencer 100 is responsible for selecting the frequency of the sound to be output by the signal generator 200 through the use of the relay 180, as well as the interval of the sound signal. The sequencer 100 may include a timer IC chip 110, such as the LM555 Timer IC chip of Texas Instruments, configured to output a signal waveform that drives a relay between two states. Alternatively, the sequencer can use a transistor or other suitable circuitry or electronics instead of an LM555 Timer IC chip.

The control voltage pin (8) and reset pin (4) of the timer IC chip 110 may be connected to a voltage source that may range from 5V to 15V DC. An adjustable resistor 120 may be wired to the voltage source and to control voltage pin (8), reset pin (4), threshold pin (6), and discharge pin (7) of the timer IC chip 110, and may also be wired to electrolytic capacitor 130. A switch 150 may be connected to the trigger pin (2) of the timer IC chip 110. The output pin (3) of the timer IC chip 110 may be connected to a forward-biased diode 160. The diode 160 may be connected to a reverse-biased diode 170 and may also be connected to a relay 180. Electrolytic capacitors 130 and 140, ground pin (1) of the timer IC chip 110, switch 150, and diode 170 may then be wired to ground.

The output signal of the timer IC 110 may be used to select the position of the relay 180, thereby selecting the frequency generated by the signal generator 200. Signal generator 200 may include two timer IC chips 210 and 220, each of which may be configured to produce a set frequency signal by adjusting the resistance values of the adjustable resistors 230, 240, 260, and 270, as well as adjusting the capacitance values of electrolytic capacitors 250 and 280. Some exemplary frequencies that may be produced include 250 Hz, 300 Hz, and 435 Hz, however, the timer IC chips may be configured to produce any frequency that may be desirable in a particular application. Timer IC chips 210 and 220 may be the 555 timer IC chip discussed above or any other suitable timer IC chip.

The output of the relay 180 may be connected to the control voltage pin (8) and reset pin (4) of the timer IC chips 210 and 220, and also may be connected to the adjustable resistors 230 and 260, respectively. The adjustable resistors 230 and 260 may be connected to the discharge pin (7) of the timer IC chips 210 and 220, respectively, and may also be connected to adjustable resistors 240 and 270, respectively. Adjustable resistors 240 and 270 may be connected to threshold pin (6) and trigger pin (2) of the timer IC chips 210 and 220, respectively, and may also be connected to electrolytic capacitors 250 and 280 respectively. Ground pin (1) of the timer IC chips 210 and 220 and electrolytic capacitors 250 and 280 may be wired to ground. Output pin (3) of the timer IC chips 210 and 220 may be connected to forward-biased diodes 290 and 291, respectively, and may output a signal of a preconfigured frequency and interval to those diodes.

The diodes 290 and 291 may be connected to the output driver 300. The output driver 300 may be used to amplify the signal outputted by the circuitry of signal generator 200. Output driver 300 may comprise a resistor 310 which may be connected to the base of the NPN transistor 320. The emitter of the NPN transistor may be connected to ground and the diode 330 may also be connected to ground. The collector of the NPN transistor 320 may be connected to the reverse-biased diode 330 and may also be connected to the contactless horn and housing 400, or other circuits to provide the desired signal output.

Figure 2:
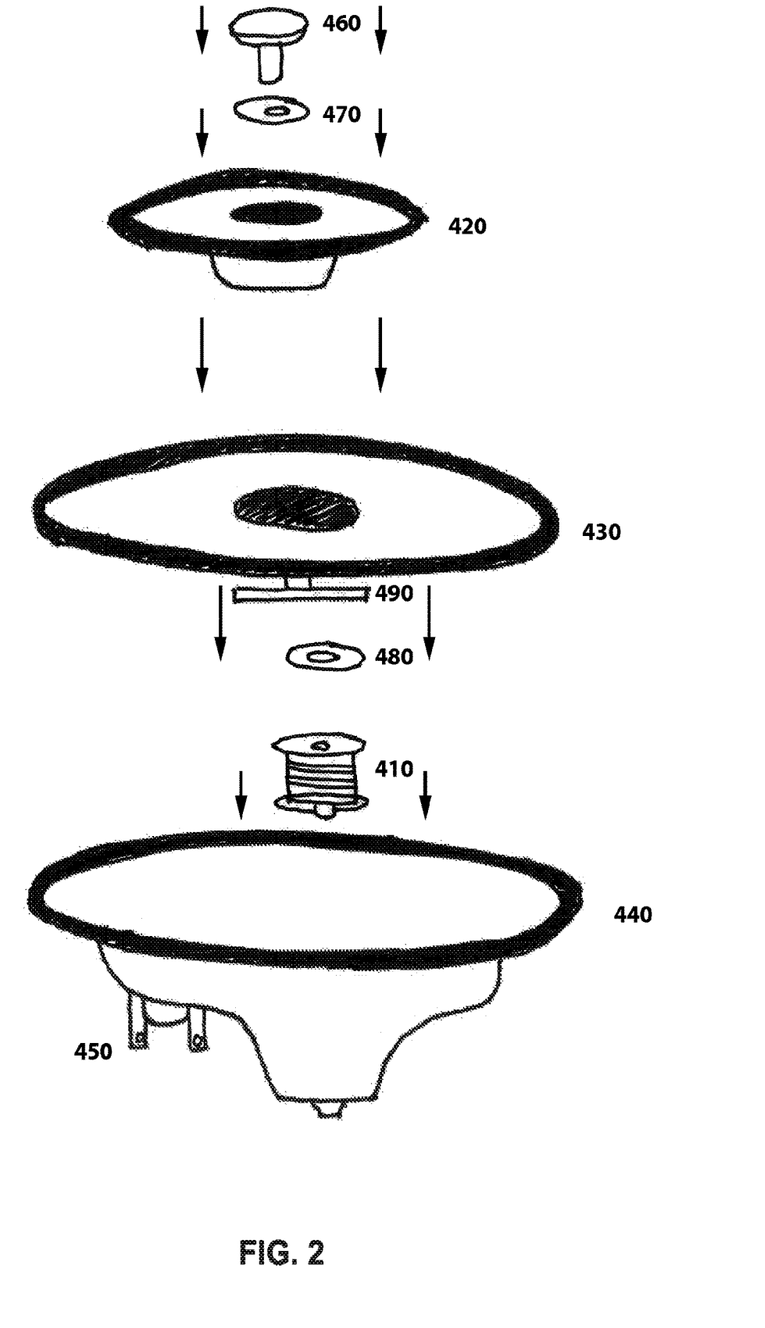
FIG. 2 is a diagram illustrating a contactless horn and sound device with attached electronic integrated circuit module according to an exemplary embodiment.

FIG. 2 is a diagram illustrating a contactless horn and sound device with attached electronic integrated circuit module according to an exemplary embodiment. Referring now to FIG. 2, the contactless horn and housing 400 may comprise an electromagnet 410 which may magnetically manipulate (i.e., repel and attract) the metal plate 490 secured to the bottom diaphragm 430 of the contactless horn to create a tone in accordance with the selected frequency generated by the signal generator 200. The electromagnet 410 may be comprised of a coil, preferably a copper coil that is 20 gauge or higher (i.e., smaller in diameter), wrapped around a metal (e.g., steel, iron, or other magnetizable metal) bolt. However, the gauge of the copper coil may be higher or lower depending on a variety of factors, such as power, weight, etc. The output of the output driver 300 is electrically connected to the electromagnet 410 via the IC connection interface 450, which is preferably positioned on the exterior of the base 440. The base 440 may be constructed using a lightweight plastic, a lightweight metal, or another suitable material. Top diaphragm 420 and bottom diaphragm 430 may be secured together using bolt 460 and washers 470 and 480 and the bottom diaphragm 430 may then be secured to the base 440 along the rim of the base 440, thereby allowing the free movement of the center portion of the diaphragms 420 and 430 so as to produce the preconfigured frequency sound.

According to an exemplary embodiment, the signal generator 200 may be used to generate multiple pitches, tones or notes simultaneously by modifying the interval at which different frequencies are generated to create different tones. For example, the electromagnet 410 may be switched from operating at 300 Hz to 500 Hz every millisecond, so as to create a low and high tone from a single device. This provides an advantage over related art horns that use two separate horns to create two different tones.

Figure 3:
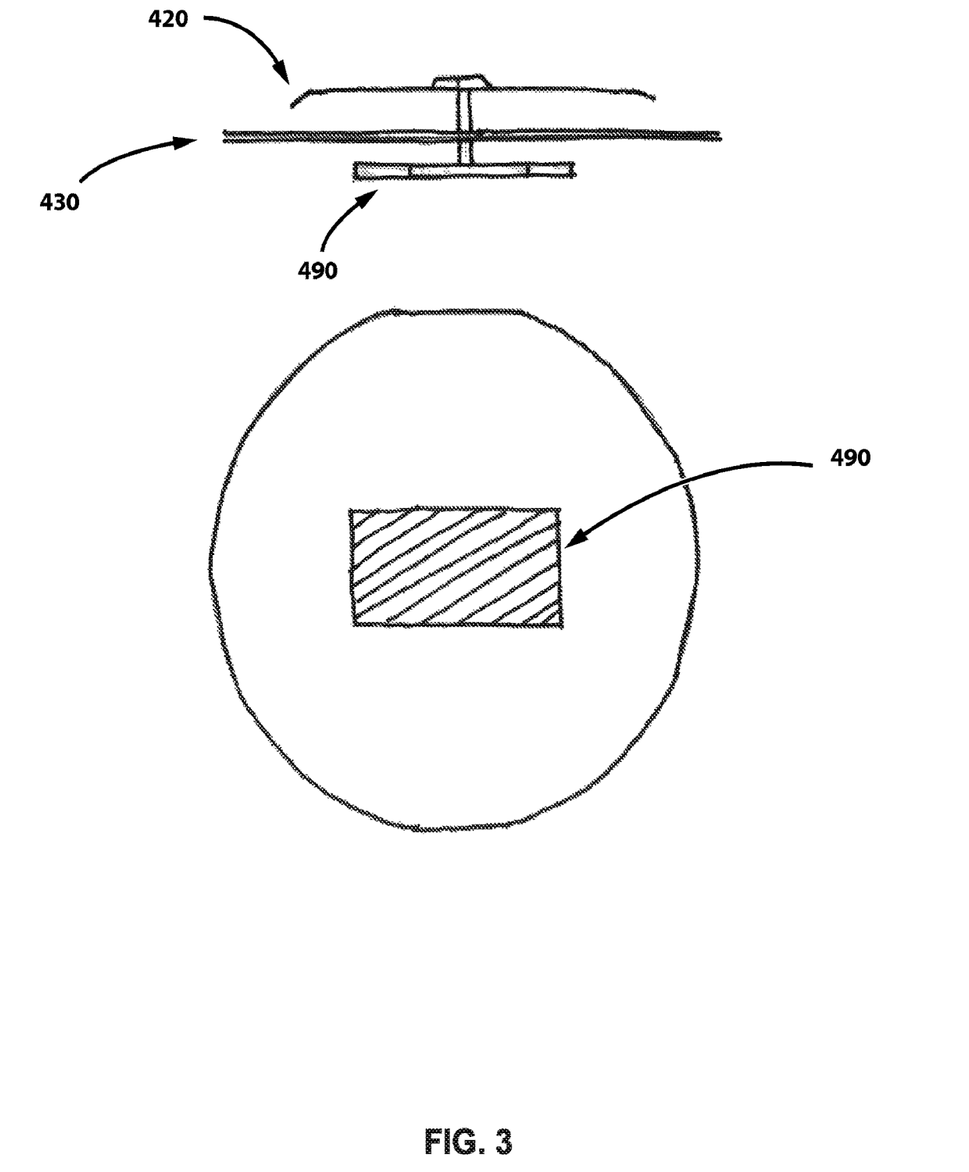
FIG. 3 is a diagram illustrating the side and bottom view of the diaphragm portion of a contactless horn and sound device according to an exemplary embodiment.

FIG. 3 is a diagram illustrating the side view and bottom view of the diaphragm portion of a contactless horn and sound device according to an exemplary embodiment. Referring now to FIG. 3, there may be a separation between the electromagnet 410 and the metal plate 480. The separation, or "air gap," preferably comprises a distance between 0.05 to 0.25 inches, with a tolerance of +/−0.05 inches. However, this separation or "air gap" may be adjusted as needed based on the desired application.

Furthermore, one skilled in the art will recognize that the contactless horn device may be modified to play additional frequency tones by adding additional signal generators 200 and additional sequencers 100 to the electronic IC module and configuring them according to the present teachings.

Figure 4:
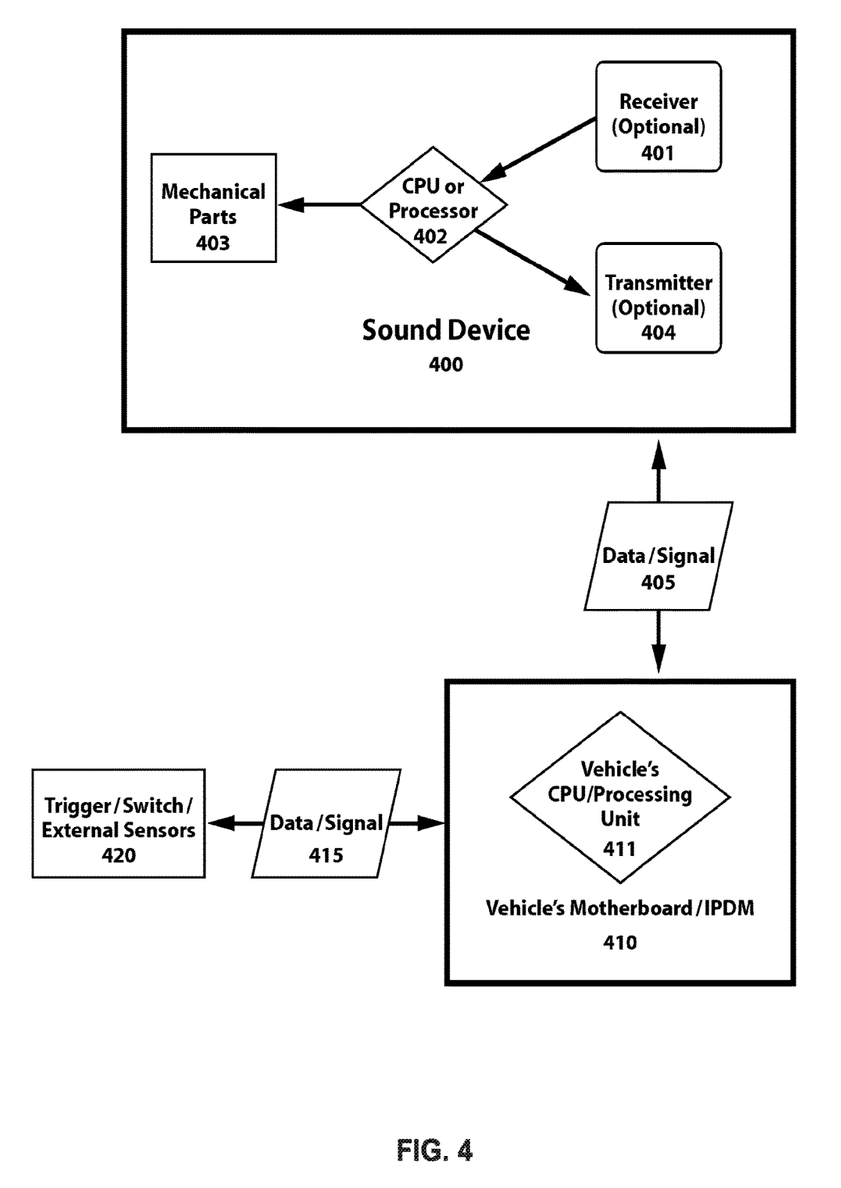
FIG. 4 is a diagram illustrating a contactless horn and sound device that interacts with a vehicle system according to an exemplary embodiment that generates multiple tones based on input received from the vehicle system.

FIG. 4 is a diagram illustrating a contactless horn and sound device that interacts with a vehicle system according to an exemplary embodiment that generates multiple tones based on input received from the vehicle system. Referring to FIG. 4, sound device 500 may interface with a vehicle's motherboard 510 or other similar component that receives data signals from various vehicle triggers, switches, and external sensors 520 indicating the status of the vehicle, such as, without limitation, the Intelligent Power Distribution Module (IPDM) found in Nissan vehicles. Sound device 500 may produce different tones, pitches, frequencies, sounds and/or intervals of sounds based on data received from the vehicle motherboard 510. For example, one or more of the various sensors 520 may send a signal 515 indicating the speed of the vehicle to the vehicle's motherboard 510, which includes one or more vehicle central processing units (CPUs) 511. The vehicle CPU 511 may send a signal 505 to the sound device 500 that is used to control the output of signal generators 200 to output a particular tone, pitch, frequency, sound, or sound interval, as discussed above. Data signal 505 or 515 may be received by receiver 501 of the sound device 500, and provided as input to a CPU 502 to control mechanical parts 503 of the sound device 500 to generate a particular sound. Sound device 500 may also include a transmitter 504 that provides feedback to the vehicle CPU 511 or the various sensors 520 indicating the status of the sound device and the pitches, tones, frequencies, or sounds it has produced.

The contactless horn and sound device of the exemplary embodiment may modify the pitch, frequency, or tone produced based on a variety of inputs provided from the various sensors 520. For example, the sound device 400 may produce a louder (that is, higher amplitude) sound if the vehicle is moving at a high rate of speed than if the vehicle is moving slowly or stopped. The sound device 500 may also produce different sounds in response to a signal that the vehicle's anti-theft alarm has been triggered, or to announce that the driver has locked or unlocked the vehicle. The sound device 500 of the exemplary embodiment may also produce multiple alarm sounds depending how the alarm was triggered. For example, if the vehicle is accidentally and innocently bumped while the vehicle is not moving, the sound device 500 may produce a softer tone or more delayed sound interval, as compared to an alarm that is triggered by someone or something smashing the vehicle's windshield or window. The pitches, frequencies, tones and sounds generated by the sound device 400 may also be tailored to each vehicle manufacturer and/or model.

Transmitter 504 may also be used to notify the driver of various conditions relating to the vehicle. For example, when the vehicle's alarm is triggered, in addition to generating a particular sound according to the type of alarm triggered, the sound device 400 may cause transmitter 504 to notify the driver that the alarm has been triggered. For example, transmitter 504 may notify the driver of the alarm via text message, email, or other electronic notification means.

In addition, many vehicles include proximity sensors that detect when the driver is within a certain distance of the vehicle, for example, to unlock the doors of the vehicle as the driver approaches. Sound device 500 may receive a signal from these proximity sensors to alert the driver that the vehicle doors are unlocked when the driver is a certain distance away from the vehicle. The tone, pitch, frequency, and volume of the sound may be configured depending on the driver's distance from the vehicle.

Sound device 500 may generate various sounds depending on various other sensors 520 in accordance with the exemplary embodiment. For example, many vehicles include sensors that detect proximity to other vehicles to alert the driver of a potential impact, (e.g., alerting the driver attempting to change lanes of other vehicles in the driver's blind spot). According to the exemplary embodiment, such sensors 520 may send signals to sound device 500 indicating the proximity of an object, and the size or type of object, based on which the sound the signal generator 200 will cause the sound device 500 to produce an appropriate sound. For example, the sound device 500 of the vehicle in the blind spot may generate a sound in response to a signal indicating that the vehicle changing lanes approaches within a specified distance of the vehicle. As another example, if a pedestrian is detected, the sound device 500 may generate a softer sound to warn the pedestrian. If a fast-moving vehicle is detected, the sound device 500 may generate a louder sound to warn the driver of the fast moving vehicle. If an animal, such as a deer, is detected, the sound device 500 may generate a sound having a frequency that will deter the animal and potentially avoid an impact.

According to an exemplary embodiment, the sound device 500 may be connected to the vehicle CPU 511 or the vehicle's sensors 520 wirelessly. One skilled in the art would understand that many wireless technologies (e.g., Bluetooth) may be used to effect wireless communication between these devices. Using a wireless connection between these devices would eliminate the need for wiring material and switches, reducing cost and weight and simplifying manufacturing.

According to an exemplary embodiment, the vehicle sensors 520 or transmitter 504 may also send a wireless signal that is received by sound devices of surrounding vehicles within a certain radius. The sound devices in the surrounding vehicles may generate sound having a pitch, frequency, tone, and/or volume that depends on the type of signal received from the vehicle sensors 520. For example, sound devices of vehicles closer to the vehicle whose sensors 520 transmitted the wireless signal may generate a louder sound than sound devices in vehicles that are further away. In addition, the frequency or tone of the generated sound may depend on the type of vehicle from which the signal originates. For example, vehicle sensors 520 located on a truck may cause a deeper and/or louder sound to be produced in surrounding vehicles, as compared to vehicles sensors 520 located on a smaller car. The sound generated by the sound devices of the surrounding vehicles may be generated within the surrounding vehicle, e.g., through the speaker system of the surrounding vehicle, or external of the surrounding vehicle, e.g., by the horn of the surrounding vehicle. By generating sound in the surrounding vehicles, background interference and noise are less likely to prevent surrounding drivers from being alerted to potential dangers.

Figure 5:
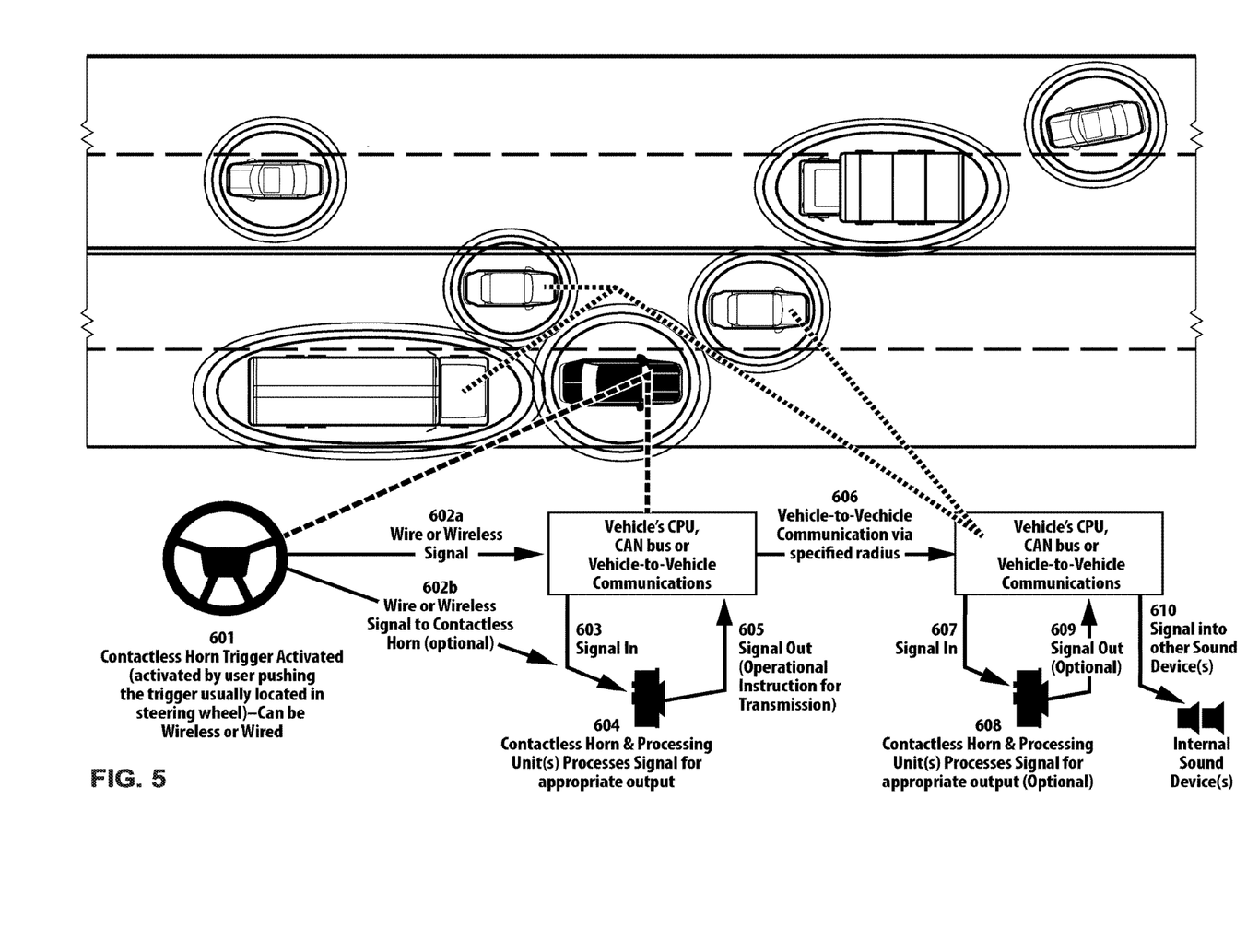
FIG. 5 is a diagram illustrating a contactless horn and sound device according to an exemplary embodiment that may communicate with surrounding vehicles.

FIG. 5 is a diagram illustrating a contactless horn and sound device according to an exemplary embodiment that may communicate with surrounding vehicles to cause a sound to be generated by a horn or audio system in the surrounding vehicles. Referring to FIG. 5, in step 601, the driver activates the contactless horn trigger of the exemplary embodiment, which may be located on the vehicle steering wheel or other location. In step 602a, a signal indicating that the horn trigger has been activated may be sent to the vehicle CPU or Controller Area Network (CAN) bus wirelessly or via wired connection. In step 602b, a signal indicating that the horn trigger has been activated may be sent directly to the contactless horn. In step 603, the vehicle CPU or CAN bus may send a signal to the contactless horn indicating one or more current operating states of the vehicle. For example, and without limitation, the vehicle CPU or CAN bus may transmit a signal indicating the vehicle speed, time of day, vehicle location, etc. In step 604, the contactless horn may process the signal received in step 603 to determine the appropriate outcome corresponding to the received signal. In step 605, the contactless horn may transmit a signal to the vehicle CPU, CAN bus, or vehicle-to-vehicle communication system indicating operational instructions for a horn or audio system in surrounding vehicles. In step 606, the vehicle-to-vehicle communication system may transmit operational instructions to vehicles located within a specified radius of the vehicle. In step 607, the CPU, CAN bus, or vehicle-to-vehicle communication system of the surrounding vehicles may transmit the received operational instructions to the respective contactless horns of the surrounding vehicles. In step 608, the contactless horns of the surrounding vehicles may process the received operational instructions to determine the appropriate output. In step 609, the contactless horns of the surrounding vehicles may transmit the appropriate operational instructions to their respective CPU or CAN bus. In step 610, the CPU or CAN bus of the surrounding vehicle may transmit operational signals to an internal sound device or audio system to generate sound according to the operational signal.

Figure 6:
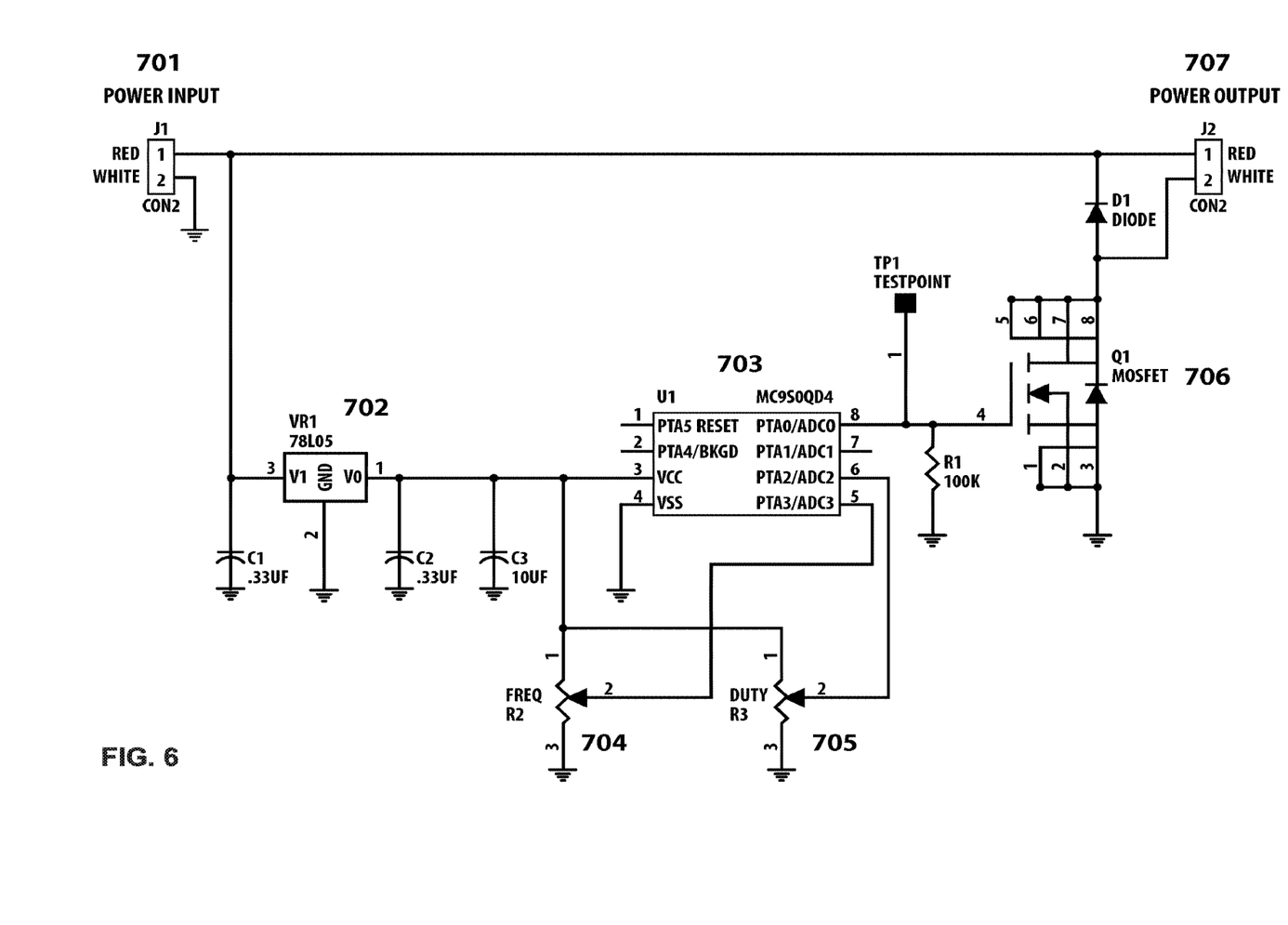
FIG. 6 is a circuit diagram illustrating an electronic circuit for a contactless horn and sound device according to an exemplary embodiment.

FIG. 6 is a circuit diagram illustrating an electronic circuit for a contactless horn and sound device according to an exemplary embodiment. The exemplary embodiment depicted in FIG. 6 may include a power input stage 701, a voltage regulator 702, a microprocessor 703, resistors 704 and 705, transistor 706 and output stage 707. Referring to FIG. 7, power is input to the contactless horn circuit at power input stage 701. The input power is received as an input at voltage regulator 702, which modifies the voltage level of the input power to an appropriate voltage for microprocessor 703. Voltage regulator 702 outputs the modified voltage to an input pin of microprocessor 703. Also connected to the same input pin of microprocessor 703 is resistor 704, which is also in parallel with voltage regulator 702. The frequency of the signal output by the microprocessor 703 is controlled by the resistance value of resistor 704. Resistor 705 is connected in parallel with resistor 704, and the resistance value of resistor 705 controls the duty cycle of the signal output by the microprocessor 703. According to the resistance values of resistors 704 and 705, microprocessor outputs a signal having a particular frequency and duty cycle. The output signal of microprocessor 703 is received as input to transistor 706. According to the exemplary embodiment of FIG. 6, transistor 706 may be a MOSFET transistor. Transistor 706 controls the signal output from microprocessor 703 and provides the output signal to output stage 706, which generates a sound through the car horn based on the received output signal.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic contactless sound device, comprising:
   an electronic integrated circuit module that selectively generates a first electrical signal having at least one of a first preconfigured frequency and a first preconfigured interval and a second electrical signal having at least one of a second preconfigured frequency and a second preconfigured interval;
   an output driver that amplifies the first electrical signal and the second electrical signal generated by the electronic integrated circuit module;
   a diaphragm that does not contain a metal contact;
   an electromagnet that manipulates the diaphragm based on the first electrical signal and the second electrical signal to produce, respectively, a first sound and a second sound different from the first sound,
   wherein the electronic integrated circuit module is in communication with at least one vehicular sensor to receive an input signal therefrom, and wherein the electronic integrated circuit module generates the first electrical signal upon receiving a first input signal from the at least one vehicular sensor and generates the second electrical signal upon receiving a second input signal from the at least one vehicular sensor, and
   wherein the at least one vehicular sensor measures distance between a vehicle containing the at least one vehicular sensor and another object, wherein the input signal reflects the measured distance between the vehicle containing the at least one vehicular sensor and the other object, and wherein the at least one vehicular sensor generates the first input signal when the vehicle containing the at least one vehicular sensor is more than a preset distance from the other object and generates the second input signal when the vehicle containing the at least one vehicular sensor is less than the preset distance from the other object.

2. The electronic contactless sound device according to claim 1, wherein the electronic integrated circuit module comprises at least one signal generator capable of selectively generating the first electrical signal and the second electrical signal.

3. The electronic contactless sound device according to claim 2, wherein the electronic integrated circuit module further comprises at least one sequencer capable of selecting the frequency of an electrical signal output by the signal generator.

4. The electronic contactless sound device according to claim 2, wherein the at least one signal generator comprises two or more timer chips, each of the two or more timer chips being configured to produce a set frequency signal.

5. The electronic contactless sound device according to claim 1, wherein the first input signal indicates a first status of a vehicle containing the one or more vehicle sensors and the second input signal indicates a second status of the vehicle containing the one or more vehicle sensors.

6. The electronic contactless sound device according to claim 5, wherein the first status of the vehicle is a first alarm status and the second status of the vehicle is a second alarm status.

7. The electronic contactless sound device according to claim 1, wherein the second sound differs from the first sound in one or more of pitch, frequency, tone, interval, and volume.

8. The electronic contactless sound device according to claim 1, wherein the electronic integrated circuit module is in wireless communication with the at least one vehicular sensor.

9. The electronic contactless sound device according to claim 1, wherein the electronic integrated circuit module is further configured to receive a third input signal from at least one vehicular sensor mounted to a vehicle other than a vehicle into which the electronic contactless sound device is installed, and wherein the electronic integrated circuit module generates a third electrical signal having at least one of a third preconfigured frequency and a third preconfigured interval upon receiving the third input signal.

10. The electronic contactless sound device according to claim 1, wherein the at least one vehicular sensor is external to the electronic integrated circuit module.

11. An electronic contactless sound device, comprising:
an electronic integrated circuit module that selectively generates a first electrical signal having at least one of a first preconfigured frequency and a first preconfigured interval and a second electrical signal having at least one of a second preconfigured frequency and a second preconfigured interval;
an output driver that amplifies the first electrical signal and the second electrical signal generated by the electronic integrated circuit module;
a diaphragm that does not contain a metal contact;
an electromagnet that manipulates the diaphragm based on the first electrical signal and the second electrical signal to produce, respectively, a first sound and a second sound different from the first sound,
wherein the electronic integrated circuit module is in communication with at least one vehicular sensor to receive an input signal therefrom, and wherein the electronic integrated circuit module generates the first electrical signal upon receiving a first input signal from the at least one vehicular sensor and generates the second electrical signal upon receiving a second input signal from the at least one vehicular sensor, and
wherein the at least one vehicular sensor measures a speed of a vehicle containing the at least one vehicular sensor, wherein the input signal reflects the measured speed of the vehicle containing the at least one vehicular sensor, and wherein the at least one vehicular sensor generates the first input signal when the vehicle containing the at least one vehicular sensor is moving at a speed below a preset speed and generates the second input signal when the vehicle containing the at least one vehicular sensor is moving at a speed above the preset speed.

12. The electronic contactless sound device according to claim 11, wherein the electronic integrated circuit module comprises at least one signal generator capable of selectively generating the first electrical signal and the second electrical signal.

13. The electronic contactless sound device according to claim 12, wherein the electronic integrated circuit module further comprises at least one sequencer capable of selecting the frequency of an electrical signal output by the signal generator.

14. The electronic contactless sound device according to claim 12, wherein the at least one signal generator comprises two or more timer chips, each of the two or more timer chips being configured to produce a set frequency signal.

15. The electronic contactless sound device according to claim 11, wherein the first input signal indicates a first status of a vehicle containing the one or more vehicle sensors and the second input signal indicates a second status of the vehicle containing the one or more vehicle sensors.

16. The electronic contactless sound device according to claim 15, wherein the first status of the vehicle is a first alarm status and the second status of the vehicle is a second alarm status.

17. The electronic contactless sound device according to claim 11, wherein the second sound differs from the first sound in one or more of pitch, frequency, tone, interval, and volume.

18. The electronic contactless sound device according to claim 11, wherein the electronic integrated circuit module is in wireless communication with the at least one vehicular sensor.

19. The electronic contactless sound device according to claim 11, wherein the electronic integrated circuit module is further configured to receive a third input signal from at least one vehicular sensor mounted to a vehicle other than a vehicle into which the electronic contactless sound device is installed, and wherein the electronic integrated circuit module generates a third electrical signal having at least one of a third preconfigured frequency and a third preconfigured interval upon receiving the third input signal.

20. The electronic contactless sound device according to claim 11, wherein the at least one vehicular sensor is external to the electronic integrated circuit module.

* * * * *